Aug. 2, 1960 C. N. O'DAY 2,947,237
AIR DIFFUSERS
Filed March 4, 1957 4 Sheets-Sheet 1

INVENTOR.
CORTLAWD N. O'DAY
BY
ATTORNEY

Aug. 2, 1960

C. N. O'DAY 2,947,237

AIR DIFFUSERS

Filed March 4, 1957

INVENTOR.
CORTLAWD N. O'DAY
BY
*[signature]*
ATTORNEY

INVENTOR.
CORTLAWD N. O'DAY
BY
ATTORNEY

Aug. 2, 1960     C. N. O'DAY     2,947,237
AIR DIFFUSERS

Filed March 4, 1957     4 Sheets-Sheet 4

INVENTOR.
CORTLAWD N. O'DAY
BY
ATTORNEY

United States Patent Office 2,947,237
Patented Aug. 2, 1960

2,947,237

AIR DIFFUSERS

Cortland N. O'Day, Port Washington, N.Y.
(% Air Devices, Inc., 185 Madison Ave., New York, N.Y.)

Filed Mar. 4, 1957, Ser. No. 643,591

5 Claims. (Cl. 98—40)

The present invention relates to an air diffuser and it particularly relates to an air diffuser of the type which will give controlled admission of conditioning or ventilating air to a room or enclosure.

The present invention will be particularly directed to a diffuser of the type which may be mounted in ceilings of rooms, offices, lofts, hallways and other enclosures and which is designed to admit a stream of conditioning or ventilating air into such enclosure with such distribution and under such conditions that a thorough mixture of the incoming air with the air in the room is achieved.

In many types of diffusion, it has been customary to weld or cast a plurality of oblique vanes, struts or louvres to direct the air into the room to achieve maximum distribution and mixing with or without excessive turbulence, but it is not readily possible to vary the characteristics of the turbulence and mixing nor is it too readily possible to achieve the desired air distribution pattern.

Furthermore, it has not been readily possible to achieve the proper distribution in accordance with the configuration of the room or the space in which the air is to be distributed.

In addition, the diffuser construction is relatively heavy and cumbersome and usually requires expensive jigs or dies to form the same, creating greater expense in installation and high cost for both maintenance and manufacture.

It is among the objects of the present invention to provide a novel air distributing outlet or diffuser which may be readily manufactured, installed and maintained at low cost with a minimum of manual labor and a maximum of economy in manufacture, assembly and installation and which will effectively distribute the air in the space desired.

Another object is to provide an air diffuser particularly adapted for installation in ceilings but also readily installed in partitions or other sides of air enclosure to create a predetermined air distribution pattern and also to achieve a desired air distribution effect with the room air and the incoming air being subject to thorough draftless intermixture without variance and pockets of air of different temperature conditions being formed in the enclosure.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it is found most suitable according to one embodiment of the present invention to provide a diffuser structure which by means of a series of curved vanes, baffles or directors will divert the air from a direction substantially normal or vertical to the wall or face from where the entry is achieved to an oblique or sidewise direction more or less parallel to the ceiling or wall and at variant directions.

In the preferred embodiment the incoming major stream is split into a plurality of smaller streams which are directed partly or wholly to cross each other and cause substantial turbulence in respect to each other and they enter the room or enclosure with the result that a relatively thick incoming stream of air will be formed or a relatively low velocity, with relatively high mass and kinetic energy which will cause a distribution and intermixture of the incoming and static room air to give a uniform desired condition or ventilated effect.

These curved deflecting blades preferably having radii between about one-quarter and one-half inch occupy substantially the entire outlet face of the diffuser except for narrow intra-slot-like passageways which permit a limited minor direct outflow from the diffuser normal to the outlet surface which in amount is less than twenty-five percent and usually less than ten percent.

The outlet faces of the vanes or blades should preferably be flush with the wall or ceiling or slightly spaced away from the wall or ceiling and their direction may be varied over 360° to give the desired combined direction effect to the incoming air.

Although in the preferred form the curved blades or vanes are so arranged that one blade or vane will be at a different direction and desirably transverse to the next adjacent blade or vane, it is possible to have all of the blades or vanes turned in one direction to give unidirectional flow, or all turned in two directions to give two directional flow or to have groups turned in the same direction over certain areas of the face of the diffuser to give three or four directional flow for variant types of transverse or oblique incoming transverse or oblique patterns.

Although the arrangement is preferably to an air diffuser having square cross-section, it may readily be applied to air diffuser of rectangular, elliptical, circular or semi-circular cross-section.

With the foregoing and other objects in view, the invention consists of a novel construction, combination and arrangement of parts as hereinafter will be more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
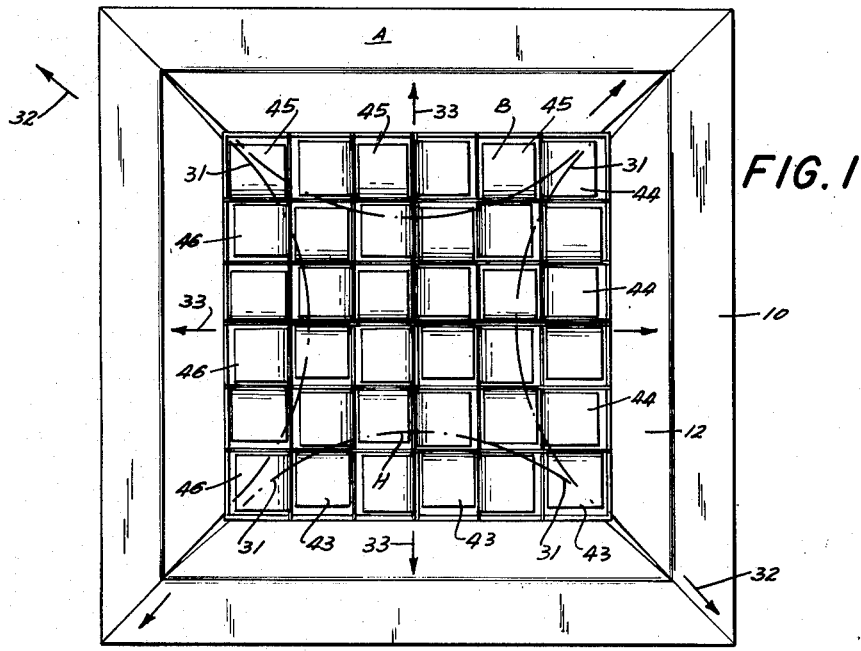
Fig. 1 is a plan view of the outside face of one form of diffuser according to the present invention.
Figure 2:
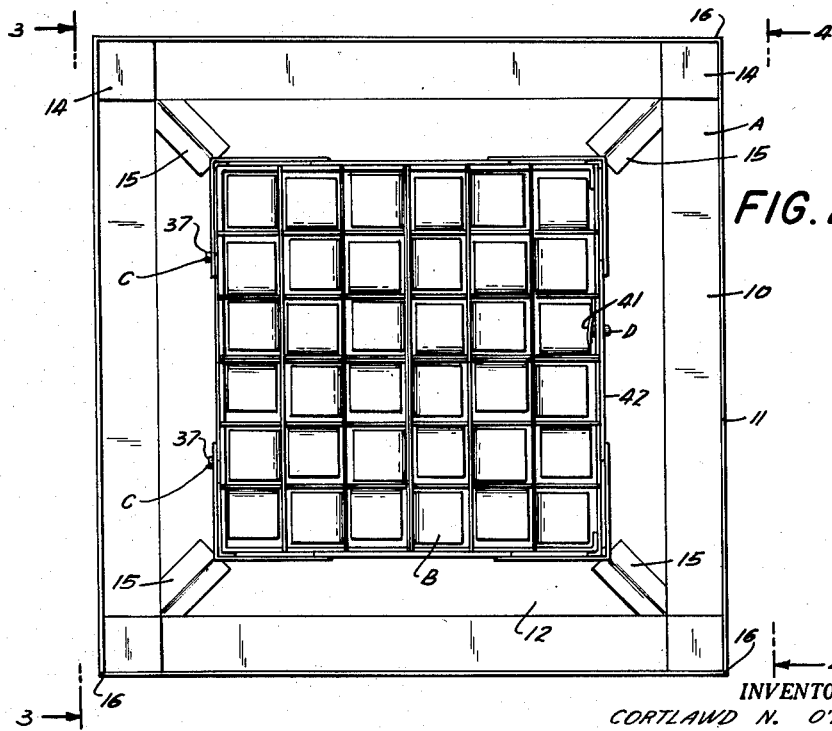
Fig. 2 is an inside plan face of the diffuser of Fig. 1, showing how it would look from inside the conduit looking through the diffuser into the room.
Figure 3:
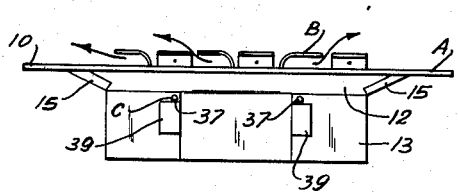

Fig. 3 is a side elevational view of the diffuser of Figs. 1 and 2, upon a smaller scale as compared to Figs. 1 and 2, showing the blades or vanes somewhat more elevated out of flush position for clearness of illustration, Fig. 3 being taken upon the line 3—3 of Fig. 2.

Figure 4:
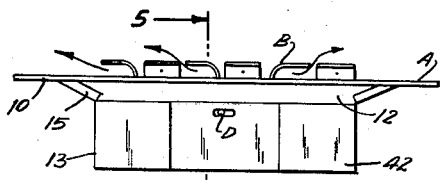

Fig. 4 is a side elevational view of the opposite side of the diffuser taken upon the line 4—4 of Fig. 2, upon the same scale as Fig. 3.

Figure 5:
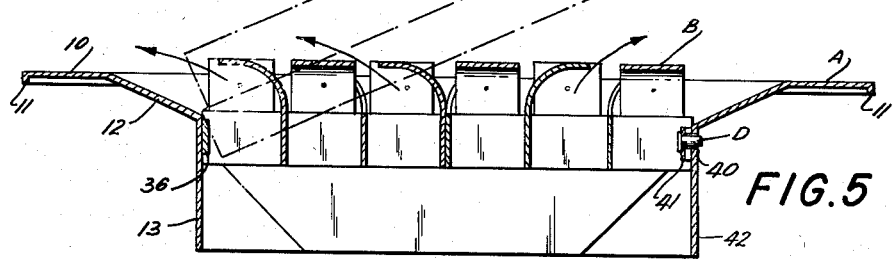

Fig. 5 is a transverse vertical sectional view of the diffuser taken upon the line 5—5 of Fig. 4, upon the same scale as Figs. 1 and 2, showing the manner of removing the diffuser core.

Figure 6:
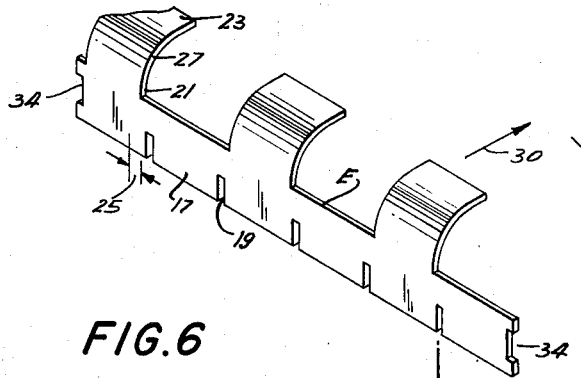

Fig. 6 is a separated fragmentary respective view showing the engagement of the vane or blade units, which make up the complete blade assembly as shown in Figs. 1 and 5 by slotted connections.

Figure 7:
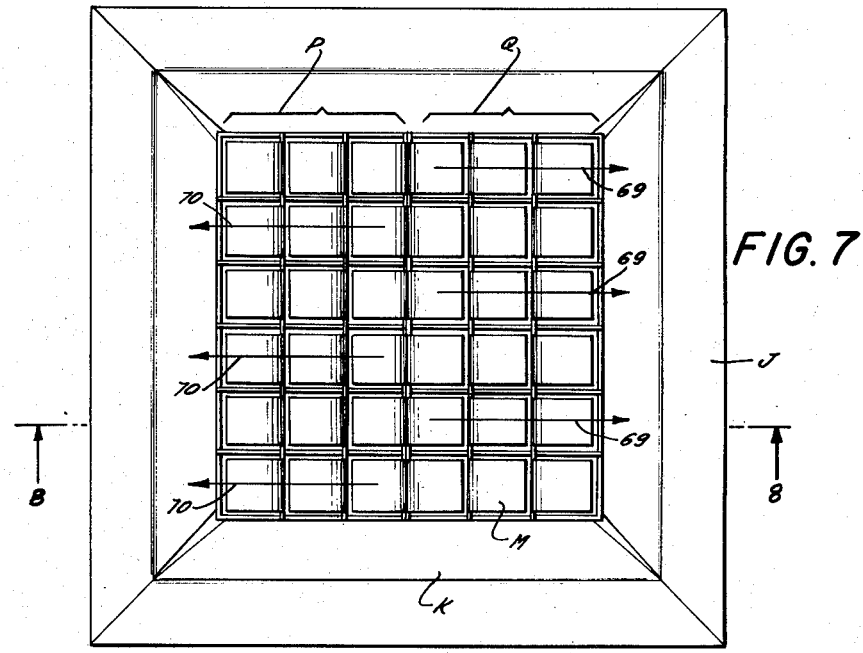

Fig. 7 is a bottom plan view of the alternative diffuser as it would appear from the room looking up, wardly from the ceiling with a two-way directional effect.

Figure 8:
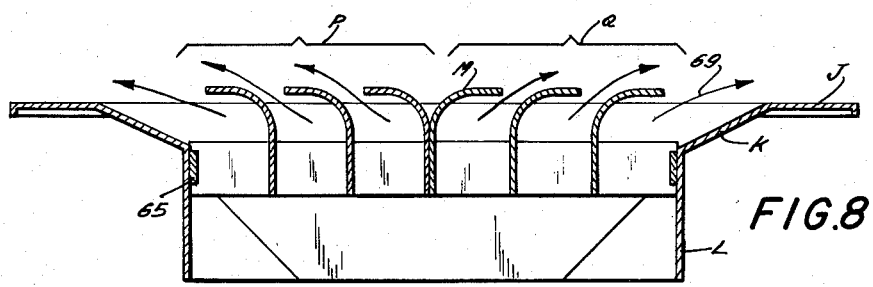

Fig. 8 is a transverse sectional view upon the line 8—8 of Fig. 7.

Figure 9:
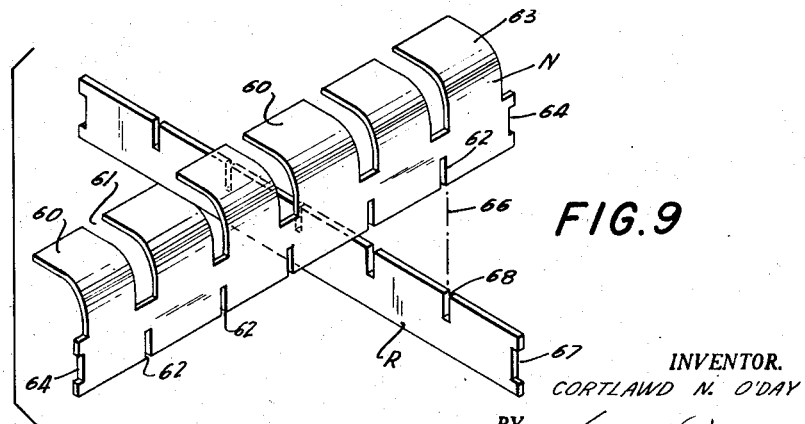

Fig. 9 is a fragmentary perspective view showing the manner of locating and assembling the vane structures of Figs. 7 and 8.

Figure 10:
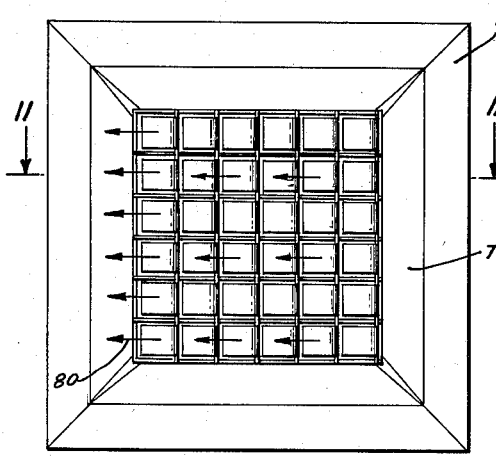

Fig. 10 is a bottom plan view similar to Figs. 1 and 7, but upon a reduced scale showing a one directional flow diffuser.

Figure 11:
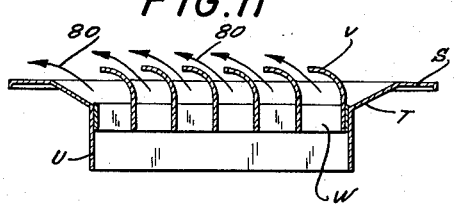

Fig. 11 is a transverse vertical sectional view upon the line 11—11 of Fig. 10.

Figure 12:
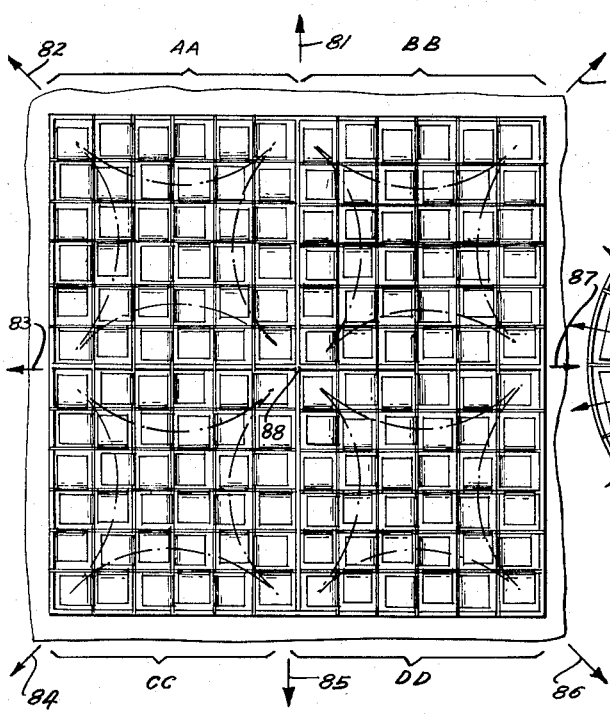

Fig. 12 is a bottom plan view similar to Figs. 1, 7 and 10 showing the application of the distribution pattern obtained in Fig. 4 to a larger diffuser face which is divided into four square or rectangular sections.

Figure 13:
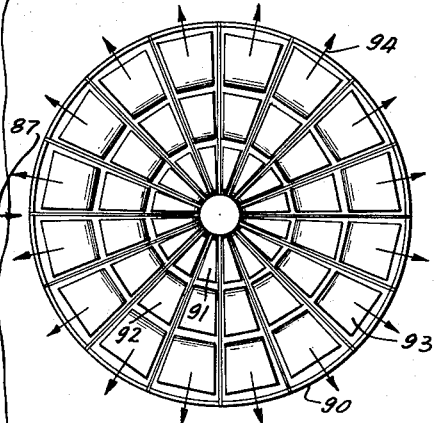

Fig. 13 is a bottom plan view similar to Figs. 1, 7, 10 and 12, showing the application of the present invention to a circular diffuser.

Referring to Figs. 1 to 6, the diffuser has a frame A for mounting in the ceiling with a removable core B.

The removable core B has the detachable connections C and D in respect to the frame A.

The core B is primarily formed of a series of crossing multi-curved blade or vane structures E and F which fit together by slotted connections, as indicated at G at Fig. 6.

The frame A has a flat peripheral portion 10 with an edge flaring 11 to be mounted against a ceiling preferably with a gasket (not shown) held in a position by the flange 11.

At the inner part of the flat face 10 there is an oblique throat or well portion 12 which continues in the transverse conduit section or neck 13 which joins with the internal conduit system (not shown).

It will be noted that this frame A has the overlapping corner reinforcements 14 and the oblique reinforcements 15 where the throat 12 meets the corners 16 of the diffuser.

The basic novelty of the present invention resides in the blade or vane structures E and F, as shown in Fig. 6, which may be stamped out integrally from the strips 17 and 18 and which are provided with the down slots 19 on the element E and up slots 20 on the element F which interengage as indicated by dot-dash lines G.

It will be noted that these slots 19 and 20 are spaced inside of the side edges 21 and 22 of the curved blades 23 and 24.

This spacing, as indicated at 25 and 26 in Fig. 6, may be decreased or increased to give the desired spacing between the blades which will enable free normal flow between the blades.

The blades themselves are so curved at 27 and 28 as to change the direction of flow from straight normal flow, as indicated at 29, to flow, as indicated at 30 in Fig. 6 at an angle of 90°.

The various streams 30 in the form of diffusers shown in Figs. 1 to 6 will cut across from each other to give a thick stream of less velocity but substantially greater mass with a pattern, indicated by the dot-dash lines at H in Fig. 1.

These dot-dash lines show that the major flow will be at the corners 31 and as indicated by the oblique arrows 32, while the minor flow will be at the sides, as indicated by the transverse arrows 33.

This pattern is achieved by turning the vanes in such a way that each adjacent vane is directed at 90° away from the next adjacent vane, as is best shown in Figs. 1 and 2, with the vanes being arranged so that adjacent each edge a major portion of the vanes in that area will be directed toward the sides of the diffuser adjacent the corner.

The curvature, as indicated at 27 and 28, should preferably be such that the air flowing in the direction 29 is gently turned without too great frictional loss without smooth radius which may vary to one-quarter to one-half inch.

The interslot connections between the strips E and F will hold the vanes together in the nest, as shown in Figs. 1 and 2 and the edge of the strips will be provided with recesses 34 and 35 which receive the encircling rectangular frame 36.

The frame 36 will carry the locking means C and D enabling ready removal or insertion of the interslotted vane structure.

The locking means C consists of studs 37 which fit into openings in the conduit wall 38 above the reinforcing plates 39 (see Fig. 3). The plates 39 are welded in position to strengthen the section 13.

The connection D consists of a stud 40 which is held upon the spring leaf 41 and may be pressed out of the recess in the conduit wall 42 to enable the core to be removed in the manner shown by dot-dash lines in Fig. 5.

Referring particularly to Fig. 1, it will be noted that along each edge at least one-half of the vanes are turned toward the edge, as indicated at 43, 44, 45 and 46 in Fig. 1.

The pattern is repeated in each of the four quarters of the arrangement shown in Fig. 1 between every second vane in each of said quarters being turned in the same direction.

This will give a very thick heavy stream of entering air thoroughly mixed with the room air and accomplishing the desired wide distribution with the necessary turbulence and with the desired length of blow.

Undesirable drafts in uneven distribution effects are altogether avoided.

In the arrangement shown in Figs. 7 to 9, the frame 5 has a throat K and a conduit L.

The core M is removable as in Figs. 1 to 6 and the blade strips N are all turned in the same direction in the opposite half sections P and Q.

The blade sections are supported by means of an unbladed slotted strip R.

It will be noted that the blades 60 are spaced side by side with only short gaps 61 with a slot 62 being positioned midway of each gap 61.

These blades also have a curvature of one-quarter to one-half inch at 63.

The ends of the blades N have the recesses 64 for the frame 65.

The holder blade R has slots 68 to engage with the slot 62, as indicated by the dot-dash lines 66.

The blade also has recesses 67 to receive the frame 65.

It will be noted that the incoming air in the section Q will all be directed as indicated by the arrows 69 while in the opposite section P, the direction 70 will control.

This will give a two directional flow without great turbulence and without unduly taking up the energy of the incoming stream and this is not preferred to the arrangement of Figs. 1 and 2.

To thicken the stream and increase the turbulence, a number of the blades in the sections P and Q are turned transversely to the main direction 69 and 70, depending upon the effect it is desired to achieve.

In the embodiment of Figs. 10 and 11, the frame S has the throat T with a conduit section U.

The vanes V are supported upon the location strips W to give unidirectional flow, as indicated by the arrows 80.

To increase the thickness of the stream and turbulence, alternative blades or a lesser number thereof may be turned transversely to the direction 80.

In Fig. 12, it is shown a plan of diffuser similar to Fig. 1 which is divided in quarter sections AA, BB, DD, each of which duplicates the distribution pattern of Fig. 1, with the result that there will be major streams at the corners and midway of the sides, as indicated by the arrows 80 and 87.

The streams meeting in the center of the device 88 will also cause a piling up of an extra thickness at this point.

Of course other arrangements are possible with half the blades facing one side and the other half of the blades facing the other side adjacent the same corner so that a maximum one-way oblique flow will be achieved.

In Fig. 13 there is shown a circular diffuser having the frame 90 with concentric rows of blades 91, 92, 93 to give a radial pattern 94.

If desired the blades may also be set tangentially instead of radially in part or in whole to given a spinning pattern or various combinations of a spinning pattern or a radial outward pattern.

It is thus apparent that the present application has achieved a novel distribution effect for an air diffuser in which the entire diffuser construction may be made up on interlocking slotted spot welded or riveted blades formed of strips with the blades projecting outwardly and turned at a curvature sufficient to twist the direction of air flow at an angle of about 90° from a direction normal to the wall or ceiling into a direction substantially parallel to or slightly oblique to the wall or ceiling.

The main direction is controlled by the number of blades which are turned toward any side and a kinetic energy of the incoming stream may be transferred into a thickened mass effect by a predetermined arrangement and alternating the direction of the curved blades.

Either oblique or side effects or one-way, two-way, three-way or four-way flow effects may be obtained with the length of the blow being readily controlled.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. An air diffuser comprising a flush rectangular frame to be positioned against the periphery of an opening in a wall or ceiling having a flange positioned flush with said wall or ceiling to which opening an air conduit leads, a transverse rectangular cross section neck portion connected within the wall or ceiling to said air conduit extending into the wall or ceiling from the frame, obliquely positioned side walls connecting said frame and said neck portion and forming a well, transversely extending crossing strips extending across said opening, the edges of said straight crossing strips being slotted and crossing strips fitting into said slots and thus having slotted connections in respect to one another and mounted inside of said neck portion and said strips having a plurality of spaced parallel separated outwardly projecting tab portions turning into quarter cylindrical portions and then into flat portions parallel to one another, said flat portions being positioned in a plane parallel to and beyond said frame and means for supporting the ends of the strips in the frame.

2. The diffuser of claim 1, said slotted connections at the sides of said gaps alongside of said projecting portions and consisting of slots on the inner and outer edges of the strips.

3. The diffuser of claim 1, said turned portions extending at different angles to each other on adjacent crossing strips.

4. The diffuser of claim 1, said crossing strips having a frame detachably mounted in said neck portion.

5. The diffuser of claim 1, said turned portions commensing at the bottom of the well and terminating in the plane beyond the plane of the frame.

References Cited in the file of this patent

UNITED STATES PATENTS

| | | |
|---|---|---|
| D. 179,847 | Griner | Mar. 12, 1957 |
| 1,978,460 | Hofferberth | Oct. 30, 1934 |
| 2,116,873 | Williams | May 10, 1938 |
| 2,144,631 | Kurth | Jan. 24, 1939 |
| 2,240,617 | Harrigan | May 6, 1941 |
| 2,282,946 | De Roo | May 12, 1942 |
| 2,560,802 | Lambert | July 17, 1951 |
| 2,598,763 | De Roo | June 3, 1952 |
| 2,616,355 | McCabe | Nov. 4, 1952 |
| 2,772,624 | Carnes | Dec. 4, 1956 |
| 2,784,659 | De Roo et al. | Mar. 12, 1957 |
| 2,792,985 | Heiman | May 21, 1957 |